United States Patent [19]

Souwand

[11] 4,118,982
[45] Oct. 10, 1978

[54] FLOW MEASUREMENT
[75] Inventor: Steve Elia Souwand, Sarnia, Canada
[73] Assignee: Polysar Limited, Sarnia, Canada
[21] Appl. No.: 851,707
[22] Filed: Nov. 15, 1977
[51] Int. Cl.² .............................................. G01F 1/70
[52] U.S. Cl. ..................................... 73/194 R; 431/5; 431/126
[58] Field of Search ................... 73/194 R; 23/277 C; 431/5, 126, 202

[56] References Cited
U.S. PATENT DOCUMENTS 1,299,540  4/1919  Bailey ................................... 73/194
2,270,443  1/1942  Jares .................................... 431/126
3,837,785  9/1974  Evans ................................. 23/277 X Primary Examiner—Herbert Goldstein
Attorney, Agent, or Firm—Stevens, Davis, Miller & Mosher

[57] ABSTRACT

The rate of flow of fluid in a flare stack is measured by injecting into the fluid an aqueous solution of an inorganic salt and calculating the rate of flow from the volume of the flare stack and the elapsed time from the injection of the aqueous solution to the appearance in the flame of the color characteristic of the inorganic salt.

6 Claims, No Drawings

FLOW MEASUREMENT

This invention relates to a novel method for the measurement of fluid flow in a flare stack for the combustion of waste plant fluids.

In the petrochemical and related industries, flare stacks are well known. The reason for the existence of flare stacks is basically twofold — first they are used to dispose of waste materials, which are generally not economically recoverable, and second, they are used to dispose of materials when the operations are in an upset condition. The materials fed to a flare stack are fluid, there usually being a knock-out drum to remove material in the liquid form before entry to the flare stack. Many methods are known for ignition of the materials and for combustion with an essentially smokeless flame.

Flare stacks are operated with flow rates of materials fed to them from essentially zero to very high rates when an upset or emergency occurs in the plant. The nature of the materials fed to flare stacks is very variable and may include essentially non-polar hydrocarbons, hydrogen and strongly polar hydrocarbyl compounds. The materials may be corrosive in nature.

The measurement of fluid flow rates in a flare stack is extremely difficult because of the wide range of flow rates and the variable nature of the materials. For safety reasons, no flow measuring device could be used which created a back pressure.

The present discovery provides a method of measuring the flow rate of fluid materials passing up a flare stack.

The present invention is directed to a method of measuring the rate of flow of fluid material passing up a flare stack of known internal volume for combustion at the uppermost end thereof, wherein an aqueous solution is injected in fine particle form into the fluid material at a point near the base of said flare stack, said aqueous solution containing an inorganic salt which generates a characteristic color in the flame when excited by the heat of combustion of the fluid material, the elapsed time is measured from the time of injection of said aqueous solution to the time of initial generation of said characteristic color in the flame at the uppermost end of the flare stack, and the rate of flow is calculated from the known internal volume of the flare stack and the measured elapsed time.

It is well known that many inorganic metal salts when present in a flame cause the flame to take on a characteristic color. Thus, antimony, bismuth, copper, lead and arsenic salts impart a blue color to the flame, sodium salts a golden yellow color, potassium salts a violet color, lithium salts crimson color, strontium salts a crimson-red color, calcium salts an orange-red color, thallium salts a green color and barium salts a yellow-green color. Selection of a suitable inorganic salt may be readily made depending on the normal color of the flame at the uppermost end of the flare stack. For example, addition of a sodium salt would produce a characteristic color which could not normally be readily distinguished from the normal color of the flame when hydrocarbons form the fluid material; however, if hydrogen were a major proportion of the fluid material, the yellow color due to the presence of sodium could be readily distinguished from the normally blue flame of the combustion of hydrogen. The selection of the most appropriate inorganic salt for use in the aqueous solution may be readily made from the prior art and knowing the normal color of the flame from the flare stack.

Because it is desirable to avoid having liquids in the fluid material passing up the flare stack, the aqueous solution is added thereto in a small amount and in fine particle form so that it becomes a part of the fluid stream flowing up the stack. The quantity of aqueous solution added is from about 0.5 to about 15, preferably about 5 to about 10, ccs of liquid. Preferably, the aqueous solution is an essentially saturated solution of the inorganic salt. Adding the aqueous solution in fine particle form is achieved by any means well known in the art. Especially preferred is when the aqueous solution is injected in atomized form. The aqueous solution is added to the flare stack at any convenient entry point near the base thereof so that it enters the flowing stream of fluid material. It is only necessary that the distance be known or measurable from the point of entry of the aqueous solution to the uppermost end of the flare stack. The internal dimensions of the flare stack, i.e. the volume, will be known from the construction thereof. Thus, the volume flow rate of the fluid material in the flare stack is simply the result of dividing the volume of the flare stack, from the point of entry of the aqueous solution to the uppermost end of the flare stack, by the elapsed time from the injection of the aqueous solution to the time of initial generation of the characteristic color in the flame. If the density of the fluid material is known or may be measured, the flow rate in volume per unit time may be converted to weight per unit time.

The following example illustrates the invention and is not intended to limit the scope thereof.

EXAMPLE

A flare stack having a distance of 185 feet from the point of injection of the aqueous solution and the uppermost end of the stack and an internal diameter of 2 feet was used. The aqueous solution added thereto was a saturated solution of barium chloride ($BaCl_2 \cdot 2H_2O$), the temperature of the solution being about 25° C. The fluid material in the flare stack was a complex mixture of hydrocarbons, hydrogen, nitrogen, carbon dioxide, carbon monoxide and methyl chloride. The major component, about 75 weight percent, was a mixture of $C_4$ hydrocarbons. Methane formed about 15 weight percent and the remaining components were present at levels of about 0.1 to about 2 weight percent. The aqueous solution was introduced as an essentially atomized spray in a stream of nitrogen gas for about 20 seconds, the volume of barium chloride solution introduced being 7.5–10 ccs. For one series of measurements, taken at intervals of about 2 minutes by fresh addition of the aqueous solution, the elapsed time before the flame at the uppermost end of the flare stack showed the yellow-green color characteristic of barium was 12, 12, 13 and 13 seconds. From the volume of the flare stack and the elapsed times, the flow rate of material in the flare stack is 174,300 cubic feet per hour (12 seconds) and 160,800 cubic feet per hour (13 seconds) for an arithmetic average for the four readings of 171,000 cubic feet per hour.

On a second occasion, using the same procedure, elapsed times were measured as 50, 65, 55 and 60 seconds. The corresponding flow rates are 41,800 cubic feet per hour (50 seconds), 32,200 cubic feet per hour (65 seconds), 38,000 cubic feet per hour (55 seconds) and 34,900 cubic feet per hour (60 seconds), for an arithmetic average of 36,700 cubic feet per hour.

What is claimed is:

1. A method of measuring the rate of flow of fluid material passing up a flare stack of known internal volume for combustion at the uppermost end thereof, wherein an aqueous solution is injected in fine particle form into the fluid material at a point near the base of said flare stack, said aqueous solution containing an inorganic salt which generates a characteristic color in the flame when excited by the heat of combustion of the fluid material, the elapsed time is measured from the time of injection of said aqueous solution to the time of initial generation of said characteristic color in the flame at the uppermost end of the flare stack, and the rate of flow is calculated from the known internal volume of the flare stack and the measured elapsed time.

2. The method of claim 1 wherein the inorganic salt is a thallium or barium salt.

3. The method of claim 1 wherein the aqueous solution is injected in atomized form.

4. The method of claim 1 wherein the quantity of aqueous solution injected is from about 0.5 to about 15 ccs.

5. The method of claim 3 wherein the quantity of aqueous solution injected is from about 5 to about 10 ccs.

6. The method of claim 3 wherein the inorganic salt is a barium salt.

* * * * *